United States Patent
Wada

(10) Patent No.: US 6,728,889 B1
(45) Date of Patent: Apr. 27, 2004

(54) PASSWORD RECOGNITION CIRCUIT AND SECURITY CHECKING METHOD

(75) Inventor: Motoharu Wada, Yamagata (JP)

(73) Assignee: NEC Corporation, Tokyo (JP)

( * ) Notice: Subject to any disclaimer, the term of this patent is extended or adjusted under 35 U.S.C. 154(b) by 867 days.

(21) Appl. No.: 09/593,459

(22) Filed: Jun. 14, 2000

(30) Foreign Application Priority Data

Jun. 15, 1999 (JP) ............................................ 11-168455

(51) Int. Cl.$^7$ ................................................ H04L 9/00
(52) U.S. Cl. ........................ 713/202; 713/168; 713/182; 713/183; 713/200; 713/201
(58) Field of Search ................................ 713/201, 168, 713/182, 183, 200, 202

(56) References Cited

FOREIGN PATENT DOCUMENTS

| JP | 05-333773 | 12/1993 |
| JP | 10-293626 | 11/1998 |
| JP | 2000-105622 A | 4/2000 |

*Primary Examiner*—Thomas R. Peeso
(74) *Attorney, Agent, or Firm*—Sughrue Mion, PLLC

(57) ABSTRACT

A security checking system, configured of a simple hardware circuit, is provided that performs a security function when the power is initially supplied or operation is resumed after a suspended mode for a long time period. When the information terminal 8, e.g. a personal computer, is turned on the power or returns from a suspended mode for power saving to a normal operational mode, the security checking system recognizes as a password the number of times the power switch 4 or the return switch 5 in a suspended mode is depressed. Only when a coincidence of the password occurs, the security checking system supplies the power or returns from the suspended mode.

18 Claims, 2 Drawing Sheets

PASSWORD RECOGNITION CIRCUIT AND SECURITY CHECKING METHOD

BACKGROUND OF THE INVENTION

Figure 1:
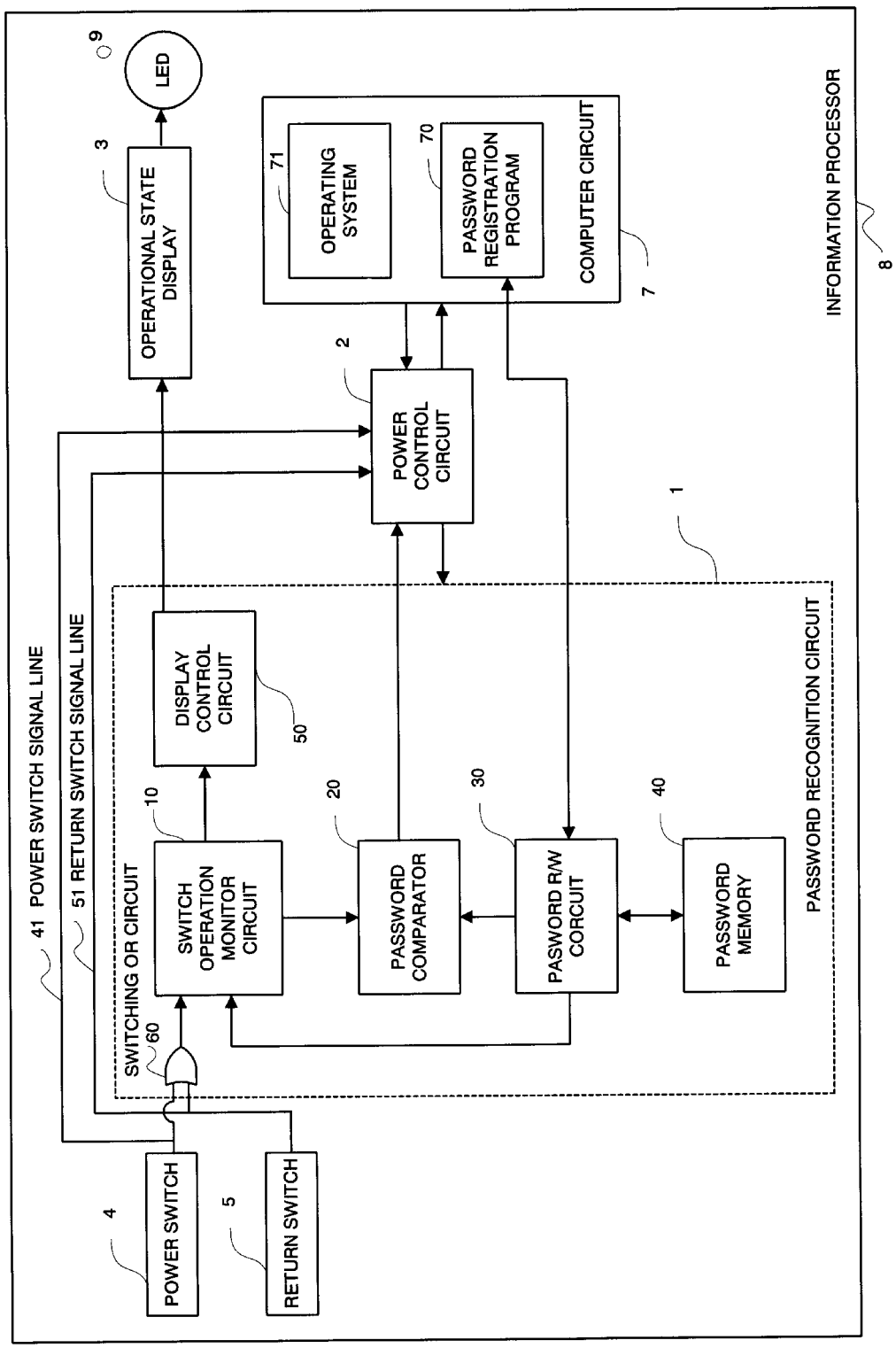

The present invention relates to a password-adopted security checking system for the use of, for example, personal computers. Particularly, the present invention relates to a password recognition circuit that supplies the power only to a security check-only partial circuit before supplying the power to the whole of a personal computer. The security check-only partial circuit recognizes as a password the number of times the power switch is depressed and first supplies power to the whole personal computer when the password security checking has passed.

In most conventional information processors with security functions, the security function is performed when the power switch is depressed to supply power to the whole system, thus running a software program for security checking.

JP-A-No. 293626/1998 discloses that when the power switch is turned on, the sub-power unit with computer functions first operates and then begins to check a password. When the checking is passed, the main power unit supplies the power to the whole information processor.

Moreover, according to JP-A No. 333773/1993, when the power switch is depressed while a predetermined combination of keys on the keyboard is been depressed, data corresponding to the depressed keys is compared with a predetermined password. When the data coincides with the password, the system power unit sets up. Thus, the security function is realized without executing a software process.

In these days of placing importance to the protection of private information and the security maintenance within corporations, there are increasing demands for providing the security function to the personal computer itself.

In the above-mentioned conventional technique, inputting passwords or personal identification numbers for the security checking of the information processor depends on entries with a keyboard. Normally, the inputting with the keyboard requires setting up the keyboard driver for a software. In such a case, other device drivers for the software are often made operable so that there is a space for rewriting the security information of invalidating the security protection before the security checking.

In order to avoid such a problem, JP-A-No. 293626/1998 and JP-A-No. 333773/1993 disclose the technique of performing the security checking by a hardware before software itself is set up. Either technique requires a considerable amount of functions to the hardware.

SUMMARY OF THE INVENTION

The present invention is made to solve the above-mentioned problems.

Moreover, the objective of the invention is to provide a technique that allows a security checking in a relatively simplified configuration.

According to the first aspect of the present invention, a password recognition circuit comprises a power switch for supplying power to an information processor; a password recognition circuit for first receiving the power when the power switch is depressed, recognizing as a password the number of times the power switch has been sequentially depressed, and deciding whether or not the password coincides with a registered password; a power control circuit for supplying power to the password recognition circuit under first depression of the power switch and receiving a password comparison result from the password recognition circuit, and supplying power to the whole of the system when the password coincides with the registered password or inhibiting power supply to the whole of the system when the password does not coincide with the registered password; and a computer circuit, with a computer function, for receiving power supply from the power control when the password coincides with the registered password.

According to the second aspect of the present invention, a password recognition circuit comprises a return switch for returning an information processor from a suspended mode to a normal operational mode; a password recognition circuit for recognizing as a password the number of times the return switch is depressed sequentially after the return switch has been depressed, and deciding whether or not the password coincides with a registered password; a power control circuit for instructing the password recognition circuit to check the password when first depression of the return switch is recognized, resuming power supply to circuits in a suspended mode when a coincidence of the password occurs in response to a password comparison result by the password recognition circuit, reporting the computer circuit of a coincidence of the password, and reporting the computer circuit of only non-coincidence, without supplying power to the circuits in the suspended mode, when the comparison result does not does not indicate coincidence; and a computer circuit for returning its status from a suspended mode to a normal operation mode when the comparison result indicates coincidence in response to the report from the power control circuit, and issuing a power halt instruction to the power control circuit after the system shutdown process has been performed when the comparison result does not indicate coincidence.

In the password recognition circuit according to the third aspect of the present invention, the password, configured based on the number of times the power switch or the return switch has been depressed, is formed of one or plural digits, the number of times representing one digit corresponding to one of 0 to 9, and wherein a break is inserted between digits at constant time intervals in a depressing operation when the password has plural digits.

In the password recognition circuit according to the fourth aspect of the present invention, the information regarding the password comprises the number of digits of a password, a password in decimal notation, and a time period for inputting one digit of a password.

In the password recognition circuit according to the fifth aspect of the present invention, the password recognition circuit comprises a password memory for storing information regarding the password; a password R/W circuit for accessing the password memory; a password comparator circuit for comparing a password input by the power switch or the return switch with a password stored in the password memory and reporting the power control circuit of coincidence or non-coincidence; a switch operation monitor circuit for counting the number of times the power switch or the return switch has been depressed, based on a time period needed for one-digit entry; and a display control circuit for collecting information regarding displaying an operational status of the switch operation monitor circuit by means of an external device such as a light emitting device.

In the password recognition circuit according to the sixth aspect of the present invention, the power control circuit instructs the password recognition circuit of password verification when the power switch is depressed in a power-suspended mode of the information processor or when the return switch is depressed in a suspended mode of the information processor.

In the password recognition circuit according to the seventh aspect of the present invention, information regarding the password is handled with a password registration program which runs on a computer circuit.

BRIEF DESCRIPTION OF THE INVENTION

Figure 2:
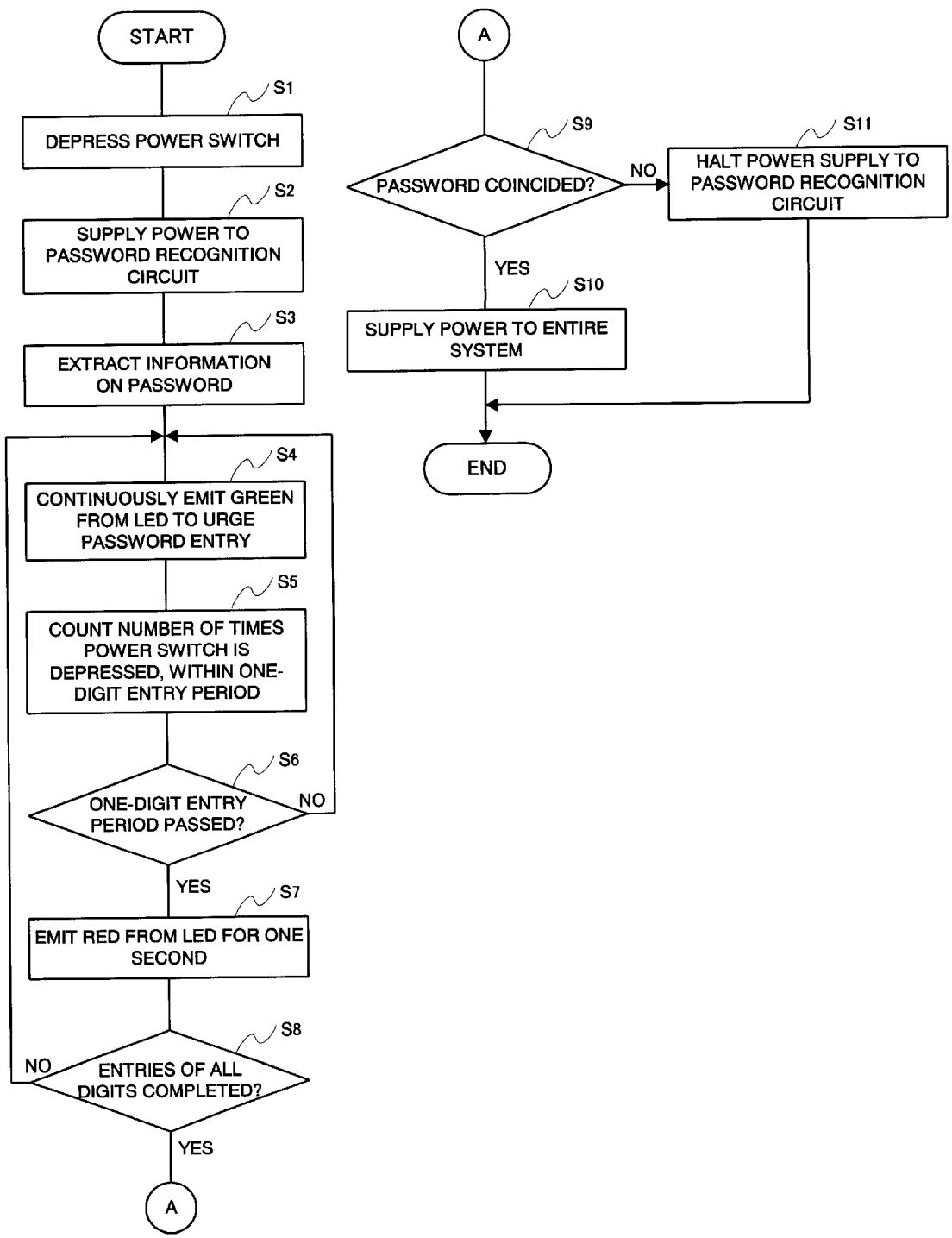

This and other objects, features, and advantages of the present invention will become more apparent upon a reading of the following detailed description and drawings, in which:

FIG. 1 is a block diagram schematically illustrating a password recognition circuit according to an embodiment of the present invention; and FIG. 2 is a flowchart illustrating the operation of the password recognition circuit according to an embodiment of the present invention.

DESCRIPTION OF THE EMBODIMENTS

A password recognition circuit of the present invention will be described below in detail with reference to the attached drawings.

Referring to FIG. 1, an information processor 8, for example, a personal computer, consists of a password recognition circuit 1, a power control circuit 2, a computer circuit 7, an operation status display 3, a power switch 4, a return switch 5, and a light emitting device 9 (LED). The password recognition circuit 1 checks a password, which is keyed in. The power control circuit 2 controls the power supplied to the whole of the information processor 8. The computer circuit 7 is power supplied and operated when the password recognition circuit 1 accepts the password. The operation status display 3 controllably glows on the LED 9 to display the operational status of the password recognition circuit 1, thus facilitating the password entry procedure. The power switch 4 is used to supply the power to the information processor 8. The return switch 5 makes the information processor 8 in a suspended mode after the information processor 8 is power supplied or returns it from the suspended mode to a normal operational mode. The light-emitting device 9 (LED) emits green or red and facilitates the depression operation of the power switch 4.

The password recognition circuit 1 further includes a password memory 40, a password R/W circuit 30, a switch operation monitor circuit 10, a password comparator circuit 20, a display control circuit 50, and an OR circuit 60. The password memory 40 is a nonvolatile memory that stores information such as a registered password. The password R/W circuit 30 controls to write and read data to and from the password memory 40. The switch operation monitor circuit 10 monitors as a password entry operation the depressing operation of the power switch 4 or the return switch 5 at predetermined intervals and then counts the number of times the switch is depressed. The password comparator circuit 10 compares the password input by depressing the switch with a password stored in the password memory 40 and decides coincidence or non-coincidence. The display control circuit 50 controls the operation status display 3. The OR circuit 60 executes a logical OR of the signal from the power switch 4 and the signal from the return switch 5 and supplies the OR signal to the switch operation monitor circuit 10.

The computer circuit 7 includes a password registration program 70 and an operating system 71 (containing a BIOS function). The password registration program 70 registers and updates passwords to the password memory 40. The operating system 71 makes the computer circuit 7 in a suspended mode when the return switch 5 is depressed in a normal operation mode or when there is no operation for a indicated time period. Moreover, the password registration program 70 returns the system status from a suspended mode to a normal operation mode when a password is accepted in a suspended mode and under depression of the return switch 5.

The power switch signal line 41 reports the fact that the power switch 4 has been depressed, to the power control circuit 2. The return switch signal line 51 reports the fact that the return switch 5 has been depressed, to the power control circuit 2. The power control circuit 2 encodes respective signals in a distinguishable form when the computer circuit 7 is in a power supply mode and then reports the encoded data to the operating system (hereinafter, referred to as OS) on the computer circuit 7.

Next, the operation of the embodiment according to the present invention will be explained below with reference to the attached drawings. FIG. 1 and FIG. 2 is a flowchart of the information processor shown in FIG. 1 in a power supply mode.

First, the operation in the case where the whole of the information processor 8 is not energized will be explained here.

When the power switch 4 is first depressed (S1), the power control circuit 2 recognizes the depression via the power switch signal line 41, thus supplying the power to the password recognition circuit 1 (S2). When return switch 5 is depressed in non power supply mode, the power control circuit 2 ignores the depression.

The password R/W circuit 30 reads information regarding a password, the digit number thereof, and one-digit entry period, or an entry time needed for one digit of a password, which are previously set to the password memory 40 by a user. Then, the password R/W circuit 30 transfers the password-and the digit number thereof to the password comparator circuit 20 and transfers the digit number of the password and one-digit entry period (S3).

The switch operation monitor circuit 10 sets one-digit entry period to the internal timer and then waits for an entry of a password.

The time period needed for one-digit entry has a break time needed for the shift of the digit.

The password comparator circuit 20, to which an password has been transferred, waits for an password input by a user to be transferred from the switch operation monitor circuit 10.

The display control circuit 50 notifies the display 3 of the password entry waiting state. The operation state display 3 controls the LED 9 near the power switch 4 to indicated a green light display to the user (S4). The green display is continuously lighted for the period needed to enter one-digit of the password.

The depression of the switch during the lighting in green of the LED 9 is counted as an effective operation. However, the depression of the switch during the lighting in red of the LED 9 is ignored or not counted. In this case, red represents a break at a re-entry due to transition to the next digit or due to an erroneous entry of a password.

The switch operation monitor circuit 10, in an entry stand-by state, counts the number of times (0 to 9 is reasonable for the number of times representing one digit) the power switch 4 is arbitrarily operated (S5). Recognition of one-digit number through the display control circuit 50 and the operation state display 3 after a lapse of a set time is indicated to the user by red-lighting the LED 9 for one second (S7). If there is the second digit of a password after one-digit entry time is again set to the internal timer, the situation becomes the mode of waiting the inputting of the second digit password. At this time, the LED 9 again emits green light (S4).

The above operation is repeated (S8) times of the same number (for example, four times for four digits settable by a user) as the number of digits of a password (S8). When all the digits are entered, the switch operation monitor circuit 10 transfers the entry to the password comparator circuit 20.

The password comparator circuit 20 compares a password registered in the password memory 40 with an input password (S9). When coincidence occurs, the password comparator circuit 20 requests the power control circuit 2 to supply the power to the computer circuit 7. The power control circuit 2 receives the request to start a power supply to the computer circuit 7 (S10).

When non-coincidence occurs, the password comparator circuit 20 requests the power control circuit 2 to stop supplying the power to the password recognition circuit 1. Thus, the power control circuit 2 stops a power supply to the password recognition circuit 1 to return the whole system in a power non-entry state (S11).

When the power switch 4 is turned on, the password R/W circuit 30 refers to the password memory 40. When "password function is used" is set to the password memory 40, a password verifying process is performed as mentioned above.

When "password function is not used" is set to the password memory 40, the password comparator circuit 20 receives the notice from the password R/W circuit 30. Then, the password comparator circuit 20 is set up, without verifying a password, to notify the power control circuit 2 of the same report as that in the coincidence case.

In manufactures shipping information processors 8 employing the present invention, it must be considered that the initial value of the password memory 40 before shipment is previously set to "password function is not used".

Setting a password to the password memory 40 is carried out as follows. When normally setting up in response to a power supply, the computer circuit 7 can set up the password registration program 70 which has functions such as setting, updating and deleting a password.

The password registration program 70 can store the following sets of information to the password memory 40.

(1) Identification information on whether or not a password is used
(2) Number of digits of a password.
(3) Password number.
(4) Time period (in second) for which one digit of a password is input.

The item (1) represents recognizing whether or not the function of recognizing and checking a password, according to the present invention, is used. If the function is used, the password checking function is operated. If the function is not used, the password checking function is not operated. The item (2) to item (4) have been already explained. The password registration program 70 uses an interface included in the password R/W circuit 30 of the password recognition circuit 1 to write and read the above-mentioned information.

Next, the case where the return switch is depressed in an operation mode and where the system is in a non-operation (use) mode for a long time will be explained below.

When a non-operation mode continues, the OS 71, which runs on the computer circuit 7, changes the status of the information processor 8 from a normal operational mode to a suspended mode. The non-operation mode is, for example, the case where the return switch is not depressed or an application program does not run or the information processor 8 is not used, in a normal mode. The time interval during which the information processor 8 changes its status from the normal operational mode to a suspended mode obeys an instruction by a user.

The suspended mode means that the power supply is cut to chips which do not operate in a sleep mode among chips configuring the information processor 8 to save the power consumption of the battery for the operation of the information processor 8. Even in this suspended mode, the power supplied to the chip for again returning the normal operational mode is not interrupted. In order to enter the suspended mode, the OS 71 instructs the power control circuit 2 to stop the power supply to devices that do not want energizing.

At the stage where the situation has been changed to the suspended mode, the return switch 5 has to be depressed to re-use the machine. Upon the depression, the power control circuit 2 informs the OS 71 that the return switch has been depressed.

When confirming the suspended mode, the OS 71 instructs the power control circuit 2 to check the password. Then, the power control circuit 2 instructs the password recognition circuit 1 to check the password number, as previously described in the depression operation of the power switch 4.

When a user depresses the return switch 5 to enter a correct password, the password comparator circuit 20 informs the power control circuit 2 of a coincidence of the password. The power control circuit 2 resumes to supply the power to the chips in a rest mode and then reports the OS 71 of the resuming of the power supply. Thus, the system returns from the suspended mode to the normal operational mode.

However, "password function not used" is set to the password memory 40, the system returns to the normal operational mode without password checking.

When a normal password is not input, the power control circuit 2, which received the notice from the password comparator circuit 20, informs the OS 71 that the password has been illegally input. After a shutdown process of the system, the OS 71 instructs the power control circuit 2 to shut down the process of the system.

When the power switch 4 is depressed in a suspended mode, in a manner similar to that in the normal operational mode, the OS 71 executes the shutdown of the system. Thereafter, the OS 71 instructs the information processor 8 to halt the power source. When the return switch 5 is depressed in non-suspended mode, the OS 71 is made in a suspended mode.

As described above, since a password is entered according to the number of times the power switch 4 is depressed, the entry operation is simplified. The simple hardware circuit performs the security checking before the start-up of software, thus providing a strong security protection.

The entire disclosure of Japanese Application No. 11-168455 filed Jun. 15, 1999 including specification, claims, drawing and summary are incorporated herein by reference in its entirely.

What is claimed is:

1. A password recognition circuit, comprising:
   a power switch for supplying power to an information processor;
   a password recognition circuit for first receiving the power when said power switch is depressed, recognizing as a password the number of times said power switch has been sequentially depressed, and deciding whether or not said password coincides with a registered password;
   a power control circuit for supplying power to said password recognition circuit under first depression of said power switch and receiving a password comparison result from said password recognition circuit, and supplying power to the whole of the system when the password coincides with said registered password or inhibiting power supply to the whole of the system when the password does not coincide with said registered password; and
   a computer circuit, with a computer function, for receiving power supply from said power control when the password coincides with said registered password.

2. The password recognition circuit defined in claim 1, wherein said password, configured based on the number of times said power switch has been depressed, is formed of one or plural digits, said number of times representing one digit corresponding to one of 0 to 9, and wherein a break is inserted between digits at constant time intervals in a depressing operation when said password has plural digits.

3. The password recognition circuit defined in claim 1, wherein said information regarding said password comprises the number of digits of a password, a password in decimal notation, and a time period for inputting one digit of a password.

4. The password recognition circuit defined in claim 1, wherein said password recognition circuit comprises:
   a password memory for storing information regarding said password;
   a password R/W circuit for accessing said password memory;
   a password comparator circuit for comparing a password input by said power switch with a password stored in said password memory and reporting said power control circuit of coincidence or non-coincidence;
   a switch operation monitor circuit for counting the number of times said power switch has been depressed, based on a time period needed for one-digit entry; and
   a display control circuit for collecting information regarding displaying an operational status of said switch operation monitor circuit by means of an external device such as a light emitting device.

5. The password recognition circuit defined in claim 1, wherein said power control circuit instructs said password recognition circuit of password verification when said power switch is depressed in a power-suspended mode of said information processor.

6. The password recognition circuit defined in claim 1, wherein information regarding said password is handled with a password registration program which runs on a computer circuit.

7. A password recognition circuit, comprising:
   a return switch for returning an information processor from a suspended mode to a normal operational mode;
   a password recognition circuit for recognizing as a password the number of times said return switch is depressed sequentially after said return switch has been depressed, and deciding whether or not said password coincides with a registered password;
   a power control circuit for instructing said password recognition circuit to check the password when first depression of said return switch is recognized, resuming power supply to circuits in a suspended mode when a coincidence of said password occurs in response to a password comparison result by said password recognition circuit, reporting said computer circuit of a coincidence of said password, and reporting said computer circuit of only non-coincidence, without supplying power to the circuits in the suspended mode, when the comparison result does not indicate coincidence; and
   a computer circuit for returning its status from a suspended mode to a normal operation mode when said comparison result indicates coincidence in response to said report from said power control circuit, and issuing a power halt instruction to said power control circuit after the system shut-down process has been performed when said comparison result does not indicate coincidence.

8. The password recognition circuit defined in claim 7, wherein said password, configured based on the number of times said power switch or said return switch has been depressed, is formed of one or plural digits, said number of times representing one digit corresponding to one of 0 to 9, and wherein a break is inserted between digits at constant time intervals in a depressing operation when said password has plural digits.

9. The password recognition circuit defined in claim 7, wherein said information regarding said password comprises the number of digits of a password, a password in decimal notation, and a time period for inputting one digit of a password.

10. The password recognition circuit defined in claim 7, wherein said password recognition circuit comprises:
    a password memory for storing information regarding said password;
    a password R/W circuit for accessing said password memory;
    a password comparator circuit for comparing a password input by said return switch with a password stored in said password memory and reporting said power control circuit of coincidence or non-coincidence;
    a switch operation monitor circuit for counting the number of times said return switch has been depressed, based on a time period needed for one-digit entry; and
    a display control circuit for collecting information regarding displaying an operational status of said switch operation monitor circuit by means of an external device such as a light emitting device.

11. The password recognition circuit defined in claim 7, wherein said power control circuit instructs said password recognition circuit of password verification when said return switch is depressed in a suspended mode of said information processor.

12. The password recognition circuit defined in claim 7, wherein information regarding said password is handled with a password registration program which runs on a computer circuit.

13. A security method for an information processor, comprising the steps of:
    supplying power only to a circuit needed for security checking when a power switch is depressed;

recognizing as a password the number of times said power switch has been sequentially depressed, and deciding whether or not said password coincides with a registered password; and receiving a password comparison result, and supplying power to the whole of the system when the password coincides with said registered password or inhibiting power supply to the whole of the system when the password does not coincide with said registered password.

14. The method defined in claim 13, wherein said password, configured based on the number of times said power switch or said return switch has been depressed, is formed of one or plural digits, said number of times representing one digit corresponding to one of 0 to 9, and wherein a break is inserted between digits at constant time intervals in a depressing operation when said password has plural digits.

15. The method defined in claim 13, wherein said information regarding said password comprises the number of digits of a password, a password in decimal notation, and a time period for inputting one digit of a password.

16. A security method for an information processor, comprising the steps of:

recognizing as a password the number of times said return switch is depressed sequentially after a return switch has been depressed, said return switch returning an information processor from a suspended mode to a normal operational mode, and deciding whether or not said password coincides with a registered password;

resuming power supply to circuits in a suspended mode when a coincidence of said password occurs in response to a password comparison result by said password recognition circuit, and returning its status from a suspended mode to a normal operation mode; and performing the system shutdown process when said comparison result does not indicate coincidence, without supplying the power to said circuit in a suspended mode, and then halting the power to said power control circuit.

17. The method defined in claim 16, wherein said password, configured based on the number of times said power switch or said return switch has been depressed, is formed of one or plural digits, said number of times representing one digit corresponding to one of 0 to 9, and wherein a break is inserted between digits at constant time intervals in a depressing operation when said password has plural digits.

18. The method defined in claim 16, wherein said information regarding said password comprises the number of digits of a password, a password in decimal notation, and a time period for inputting one digit of a password.

* * * * *